UNITED STATES PATENT OFFICE.

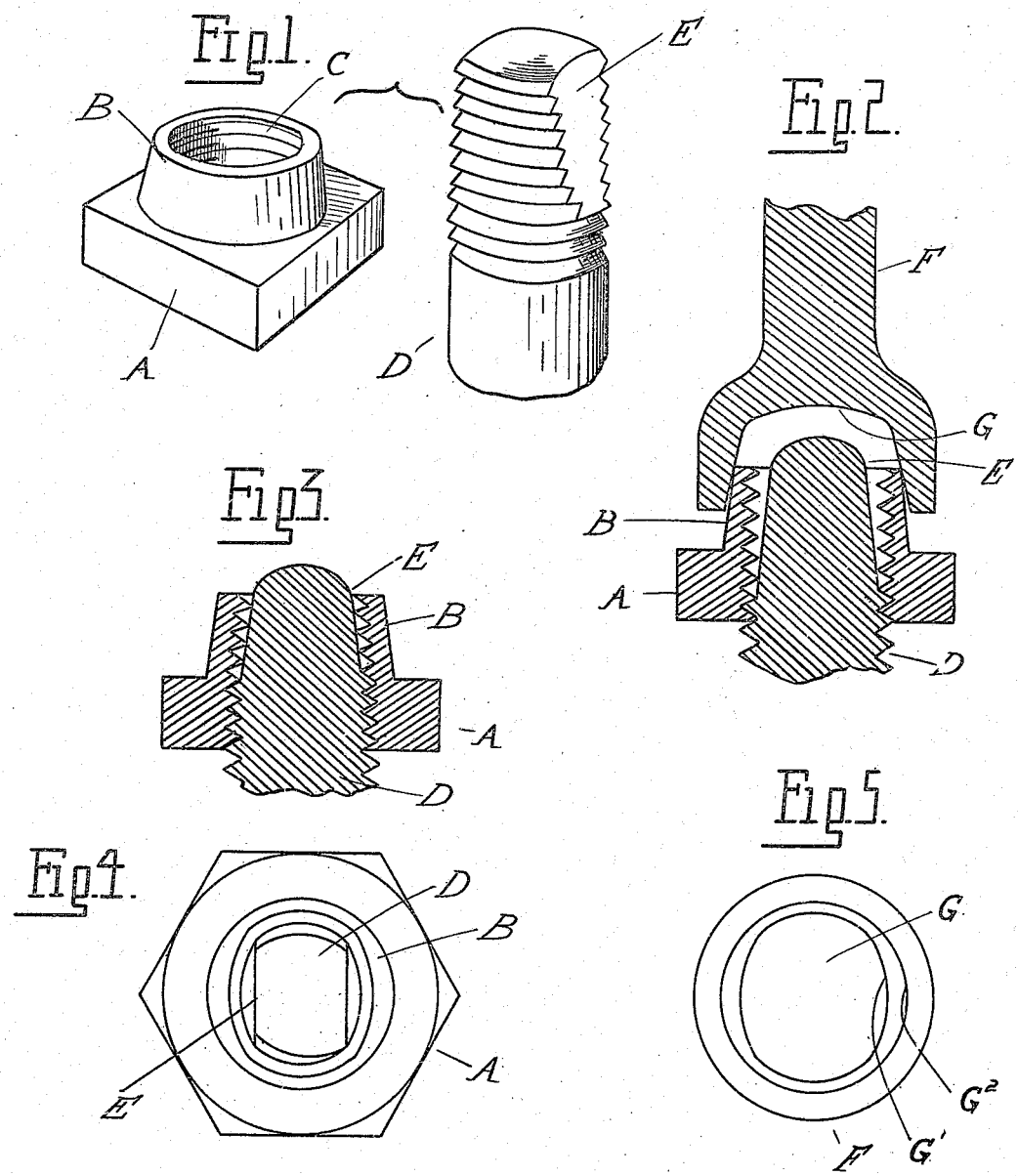

CHARLES ZINOW, OF DETROIT, MICHIGAN, ASSIGNOR OF ONE-HALF TO LOUIS SOLOMON, OF DETROIT, MICHIGAN.

BOLT AND NUT LOCK.

No. 930,450.  Specification of Letters Patent.  Patented Aug. 10, 1909.

Application filed September 24, 1908. Serial No. 454,621.

*To all whom it may concern:*

Be it known that I, CHARLES ZINOW, a citizen of the United States of America, residing at Detroit, in the county of Wayne and State of Michigan, have invented certain new and useful Improvements in Bolt and Nut Locks, of which the following is a specification, reference being had therein to the accompanying drawings.

The invention relates to a construction of bolt and lock nut and consists in certain novel features as hereinafter set forth.

In the drawings—Figure 1 is a perspective view of the bolt and nut detached; Fig. 2 is a longitudinal section of the nut in engagement with the bolt but before locking, also showing the set by which the nut is locked; Fig. 3 is a similar view after the nut is locked; Fig. 4 is a plan view of Fig. 3; Fig. 5 is a bottom plan view of the set.

It is one of the objects of the invention to provide a construction with which the nut can be quickly locked and when locked will be securely held from accidental disengagement while at the same time it is capable of being removed at any time by the application of sufficient force, and when replaced may be again locked. These results are obtained by beveling off a portion of the threaded end of the bolt and by providing the nut with an annular tapering flange which, after the nut is in engagement with the bolt, may be compressed against said beveled face. Compression will upset the metal, contracting the peripheral length of the flange and preventing the turning of the nut unless sufficient pressure is applied to again expand the metal.

In detail, A is the nut provided with a polygonal head, which, as illustrated, is square.

B is the annular flange formed by cutting away the stock from which the nut is made so as to taper toward its outer end. The aperture C through the nut is threaded, the threads extending through the flange portion as well as the polygonal portion.

D is the bolt correspondingly threaded to the nut and having a bevel portion E at its outer end, preferably two of said bevel faces oppositely arranged.

To facilitate the setting or locking of the nut, I preferably provide a setting tool F which has a recess G in its end for engaging with the flange B of the nut. The walls of this recess G are so formed as to compress the flange B upon all sides and force it to conform to the contour of the bolt. Thus the inner end of the recess G is of oval section, as indicated at $G'$, Fig. 5, while the outer end, indicated by the line $G^2$ is circular and of a size to fit the base or longitudinal end of the flange B. It is therefore apparent that when the set is driven down over the flange B of the nut it will contract and compel it to conform to the shape of the bolt. When the nut is to be removed, the application of sufficient turning force will again expand the flange B so that the threaded portion thereof will conform to the original section of the bolt and the nut may then be disengaged. When it is replaced, it may be again set in the same manner as before described.

What I claim as my invention is:

1. The combination of a threaded stud having diametrically oppositely beveled faces removing a portion of the threads, a nut engaging said stud provided with an annular internally threaded and externally tapered flange, said flange being contracted about the stud to conform to the contour thereof with the threads flattened against the oppositely beveled faces.

2. The combination of a threaded stud having a portion of the threads removed to form diametrically opposed flat faces, a nut engaging said stud provided with an annular tapered flange, said flange being contracted about the stud, for the purpose described.

In testimony whereof I affix my signature in presence of two witnesses.

CHARLES ZINOW.

Witnesses:
  NELLIE KINSELLA,
  JAMES P. BARRY.